3,471,011
PROCESS FOR IMPROVING THE BRIGHTNESS OF CLAYS

Joseph Iannicelli and Nathan Millman, Macon, Ga., and William J. D. Stone, Ottawa, Ontario, Canada, assignors to J. M. Huber Corporation, Locust, N.J., a corporation of New Jersey
No Drawing. Continuation-in-part of application Ser. No. 481,118, Aug. 19, 1965. This application Sept. 1, 1966, Ser. No. 576,564
Int. Cl. B03c 7/00, 1/00
U.S. Cl. 209—214
2 Claims

ABSTRACT OF THE DISCLOSURE

A method of improving the brightness of kaolin clay by the separation of discoloring particles having a low magnetic susceptibility is disclosed. The separation is achieved by subjecting a kaolin clay-water slurry to a magnetic field of at least 8,500 gauss for at least 30 seconds.

---

This application is a continuation-in-part of our copending application, Ser. No. 481,118, now abandoned, filed Aug. 19, 1965, entitled "Process for improving the Brightness of Clays."

This invention is concerned with a method for improving the brightness of kaolin clays. More particularly, this invention is concerned with a method for improving the brightness of kaolin clays through the use of high intensity wet magnetic means.

Natural clays vary considerably in their color properties, even when produced from mines in the same locality or even from different sites in the same mine. Natural kaolin clay deposits contain discoloring contaminants, for example, iron and titanium minerals.

Iron contaminants are deleterious to clay brightness and considerable effort has been expended on removal of iron contaminants by physical and chemical means—including the well known practice of bleaching with hydrosulfites. Under the most favorable conditions chemical bleaching usually removes less than half of the iron present in clays. Physical separation techniques such as flotation are generally even less effective for iron removal than chemical bleaching.

Because of the extreme difficulty experienced in removal of iron impurities, it has been widely theorized that a substantial portion of the iron content in kaolin is incorporated in the kaolin crystal as an isomorphous replacement for aluminum.

Clay slurries in prior art practices have been subjected to relatively mild magnetic separation treatment to remove foreign or tramp iron particles with which the clay may have become contaminated during manufacture or transport. In some instances such methods have also been used to remove strongly ferromagnetic contaminants such as ilmenite and magnetite. However, the bulk of the iron contaminants in most clays has failed to respond to magnetic separation techniques. As a result it has been assumed that most, if not all, of the iron content in kaolin exists in a completely nonmagnetic form and that as such it is not amenable to magnetic separation.

We have discovered a method for removing from kaolin iron bearing contaminants which have been hitherto considered nonmagnetic, thereby substantially increasing the brightness of the thus beneficiated kaolin.

We have discovered that iron contaminants are present in kaolin as particles of low magnetic susceptibility (relative attractability of less than 2.0—Taggart, Handbook of Mineral Ore Dressing) and these can be physically removed by subjecting a clay slurry to a magnetic field of a definite threshold intensity for a carefully controlled minimum period of time.

The prior art, by failing to recognize the importance and interrelationship of threshold intensity and retention time, has failed to brighten kaolin materially by magnetic means.

By the process of our invention, we have been able to beneficiate to acceptable brightness specifications clays which have been hitherto discarded due to a high level of iron contaminants. Likewise, by application of our invention, we have been able to beneficiate conventional grades of crude kaolin to significantly higher brightness levels than can be achieved by normal processing methods.

In the past, numerous other methods have been developed for increasing the brightness of clays. Fractionation is one of the more common methods of improving the brightness, since in general, the finer the particle size the brigher the clay. Fractionation generally results in an increase in brightness of from about 0.5 point up to about 3.5 points, above that of the original clay. Fractionation alone generally will not sufficiently improve the more discolored clays for commercial acceptability. These more discolored clays require additional treatment, such as chemical bleaching. Bleaching with chemicals such as zinc or sodium hydrosulphite generally results in an increase of about 2 to 5 brightness points. Chemical bleaching is limited as it has been found the use of large quantities of chemical bleaching agents increase clay slurry viscosity due to the presence of a high level of soluble salts. There are other methods of improving the brightness of clays, but generally they are quite expensive and the the increase in brightness does not justify the additional expense.

It is, therefore, the primary object of this invention to provide a method for increasing the brightness of clays by the removal of discoloring contaminants.

Another object of this invention is to increase the brightness of clays by the removal of minute iron mineral particles.

Another object of this invention is to increase the brightness of clays by the removal of minute discoloring iron mineral particles of low magnetic susceptibility.

Other objects and advantages will be readily apparent to those skilled in the art from the following detailed description.

Generally, the above objects of our invention are accomplished by passing a clay slurry through a high intensity magnetic energy field and retaining the slurry in this energy field for a relatively long period of time.

More specifically, it has been found that the brightness of clays may be increased as much as several brightness points through the use of high intensity magnetic energy. One of the several wet magnetic separator machines sold today is the Jones machine, manufactured by Jones Separators, Ltd. The Jones machine produces a maximum field intensity of between 20,000 to 22,000 gauss which represents the saturation magnetic flux density of an iron core. However, intensities in excess of 22,000 gauss can also be used in the practice of this invention.

With the process of the present invention, the clay slurries are retained within the high intensity magnetic energy field, preferentially from about 30 seconds up to about 8 minutes. The slurries may be retained much longer within the high intensity magnetic energy field. In addition, the high intensity of the magnetic energy field may vary from 8,500 gauss up to the limitation of the particular machine used. With some equipment, the maximum intensity is around 22,000 gauss, but there is in actuality no maximum intensity limitation for the method of this invention. Clays of various particle size distribution and percent solids will operate efficiently in the method of this invention. The percent solids may vary from about 15 percent up to about 40 percent, when operating at room temperature. Slurries of higher solids concentration may be used by elevating the slurry temperature. The best results are obtained by using clays of finer than 44 micron diameter particles, E.S.D., equivalent spherical diameter. The brightness of the clays is determined under a standard procedure as set forth in T.A.P.P.I. T–644 m–54. It is preferred in the method of this invention that the clay slurry treated in the high intensity magnetic energy field be deflocculated. The amount of dispersing agent used may vary from about one pound to about 30 pounds per ton of dry clay. The generally used dispersing agents are all acceptable in the present invention.

The invention will be more fully understood by reference to the following examples which are illustrative thereof. All percentages are by weight unless otherwise indicated.

Example 1

As a control for the next eight examples, a sample of unbleached kaolin clay slurry, 30 percent solids, containing 92 percent finer than two micron diameter particles, E.S.D., having a G.E. brightness of 80.3 points, was dispersed with a total of six pounds of sodium hexametaphosphate per ton of dry clay and was bleached with ten pounds of zinc hydrosulphite per ton of dry clay and four pounds of alum per ton of dry clay resulting in a G.E. brightness of 86.1 points.

Example 2

The dispersed clay slurry from Example 1 was retained in a high intensity magnetic energy field of 8,500 gauss for two minutes. The slurry was then withdrawn from the field, bleached with ten pounds of zinc hydrosulphite and four pounds of alum per ton of dry clay resulting in a clay brightness of 87.3 points, an increase of 1.2 points over that of the control.

Example 3

The dispersed clay slurry of Example 1 was retained in a magnetic energy field of 15,000 gauss for two minutes. The clay slurry was withdrawn from the energy field and bleached with ten pounds of zinc hydrosulphite and four pounds of alum per ton of dry clay resulting in a clay brightness of 87.6 points, an increase of 1.5 points over that of the control.

Example 4

The dispersed clay slurry from Example 1 was retained in a magnetic energy field of 17,000 gauss for two minutes. The clay slurry was withdrawn from the energy field and bleached with ten pounds of zinc hydrosulphite and four pounds of alum per ton of dry clay resulting in a clay brightness of 87.7 points, an increase of 1.6 points over the control.

Example 5

The dispersed clay slurry from Example 1 was retained in a magnetic energy field of 18,000 gauss for 0.5 minute. The slurry was then withdrawn from the energy field and bleached with ten pounds of zinc hydrosulphite and four pounds of alum per ton of dry clay resulting in a clay brightness of 87.2 points, an increase of 1.1 points over that of the control.

Example 6

The dispersed clay slurry of Example 1 was retained in a magnetic energy field of 18,000 gauss for one minute. The slurry was then withdrawn from the energy field and bleached with ten pounds of zinc hydrosulphite and four pounds of alum per ton of dry clay resulting in a clay brightness of 87.6 points, an increase of 1.5 points over that of the control.

Example 7

The dispersed clay slurry of Example 1 was retained in a magnetic energy field of 18,000 gauss for two minutes. The slurry was then withdrawn from the energy field and bleached with ten pounds of zinc hydrosulphite and four pounds of alum per ton of dry clay resulting in a clay brightness of 88.0 points, an increase of 1.9 points over that of the control.

Example 8

The dispersed clay slurry of Example 1 was retained in a magnetic energy field of 18,000 gauss for four minutes. The slurry was then withdrawn from the energy field and bleached with ten pounds of zinc hydrosulphite and four pounds of alum per ton of dry clay resulting in a clay brightness of 88.4 points, an increase of 2.3 points over that of the control.

Example 9

The dispersed clay slurry of Example 1 was retained in a magnetic energy field of 18,000 gauss for eight minutes. The slurry was then withdrawn from the energy field and bleached with ten pounds of zinc hydrosulphite and four pounds of alum per ton of dry clay resulting in a clay brightness of 88.6 points, an increase of 2.5 points over that of the control.

Example 10

As a control for the next 8 examples, a sample of unbleached clay from which all dispersant had been removed by washing was slurried to 30 percent solids, said clay containing 92 percent finer than 2 micron diameter particles, E.S.D., and having a brightness of 82.1 points was bleached with 8 pounds of zinc hydrosulphite per ton of dry clay, resulting in a clay brightness of 86.7 points.

Example 11

The unbleached clay slurry of Example 10 was dispersed with one pound of sodium hexametraphosphate per ton of dry clay and then exposed to a magnetic energy field of 18,000 gauss for four minutes. The clay slurry was then withdrawn from the energy field and a portion of it tested for brightness, resulting in a clay brightness of 83.5 points. The remaining portion of the treated clay slurry was then bleached with eight pounds of zinc hydrosulphite per ton of dry clay resulting in a clay brightness of 88.0 points, an increase of 1.3 points over that of the bleached control.

Example 12

Example 11 was repeated using two pounds of sodium hexametaphosphate per ton of dry clay resulting in a clay brightness of 84.2 points before bleaching and 88.4 points after bleaching, an increase of 1.7 points over that of the bleached control.

Example 13

Example 11 was repeated using three pounds of sodium hexametaphosphate per ton of dry clay resulting in a clay brightness before bleaching of 84.3 points and after bleaching of 88.5 points, an increase of 1.8 points over that of the bleached control.

Example 14

Example 11 was repeated using four pounds of sodium hexametaphosphate per ton of dry clay resulting in a clay brightness of 84.4 points before bleaching and 88.7 points after bleaching, an increase of 2 points over that of the bleached control.

Example 15

Example 11 was repeated using eight pounds of sodium hexametaphosphate per ton of dry clay resulting in a clay brightness of 84.4 points before bleaching and 88.7 points after bleaching, an increase of 2 points over that of the bleached control.

Example 16

Example 11 was repeated using twenty pounds of sodium hexametaphosphate per ton of dry clay resulting in a clay brightness of 84.5 points before bleaching and 88.7 points after bleaching, an increase of 2 points over that of the bleached control.

Example 17

The unbleached clay slurry of Example 10 was dispersed with four pounds of sodium hydroxide per ton of dry clay and was then exposed to a magnetic energy field of 18,000 gauss for four minutes. The slurry was then withdrawn from the energy field and bleached with eight pounds of zinc hydrosulphite per ton of dry clay resulting in a clay brightness of 88.8 points, an increase of 2.1 points over that of the bleached control.

Example 18

The unbleached clay slurry of Example 10 was diluted to 20 percent solids and dispersed with four pounds of sodium hexametaphosphate per ton of dry clay. This slurry was then exposed to a magnetic energy field of 18,000 gauss for four minutes. The slurry was then withdrawn from the energy field and a portion was tested for brightness resulting in a clay brightness of 84.7 points. The remainder of the slurry was then bleached with eight pounds of zinc hydrosulphite per ton of dry clay resulting in a clay brightness of 88.9 points, an increase of 2.2 points over that of the control.

Example 19

As a control for the following three examples a sample of unbleached kaolin clay containing 92 percent finer than two micron diameter particles, E.S.D., and having a brightness of 80.6 points was slurried to 20 percent solids and dispersed with four pounds of sodium hexametaphosphate per ton of dry clay. The clay was then bleached with eight pounds of zinc hydrosulphite per ton of dry clay resulting in a clay brightness of 86.6 points.

Example 20

The starting clay of Example 19 was slurried to 20 percent solids and dispersed with four pounds of sodium hexametaphosphate per ton of dry clay. The slurry was retained in a magnetic energy field of 18,000 gauss for four minutes. The slurry was withdrawn from the energy field and a portion was tested for brightness resulting in a clay brightness of 82.6 points. The remainder of this slurry was bleached with eight pounds of zinc hydrosulphite per ton of dry clay resulting in a clay brightness of 88.2 points, an increase of 1.6 points over that of the control.

Example 21

The starting clay of Example 19 was slurried to 30 percent solids and dispersed with four pounds of sodium hexametaphosphate per ton of dry clay. The slurry was retained in a magnetic energy field of 18,000 gauss for four minutes. The slurry was withdrawn from the energy field and a portion thereof was tested for brightness resulting in a clay brightness of 82.7 points. The remainder of the slurry was bleached with eight pounds of zinc hydrosulphite per ton of dry clay resulting in a clay brightness of 88.1 points, an increase of 1.5 points over that of the control.

Example 22

The starting clay of Example 19 was slurried to 40 percent solids and dispersed with four pounds of sodium hexametaphosphate per ton of dry clay. The slurry was then retained in a magnetic energy field of 18,000 gauss for four minutes. The slurry was then withdrawn from the energy field and a portion thereof checked for brightness resulting in a clay brightness of 82.0 points. The remainder of the slurry was bleached with eight pounds of zinc hydrosulphite per ton of dry clay resulting in a clay brightness of 87.6 points, an increase of 1 point over that of the bleached control.

The proceeding four examples demonstrate that in general the lower the percent solids during magnetic separation the higher the brightness improvement over that of the untreated bleached control example. The best results appear to be obtained from about 20 percent solids to about 30 percent solids although acceptable results can be obtained by practicing the methods of this invention through a much wider range of solids percentages.

Example 23

As a control for the next three examples a crude clay containing 69.7 percent particles finer than two micron diameter, E.S.D., was kneaded, slurried to 30 percent solids without dispersant, degritted, and spray dried. The dried clay had a brightness of 70.3 points. The clay was slurried to 30 percent solids, dispersed with four pounds of sodium hexametaphosphate per ton of dry clay and allowed to fractionate to a 90 percent finer than two micron diameter particles, E.S.D., fraction. The 90 percent fraction was then bleached with 15 pounds of zinc hydrosulphite per ton of dry clay resulting in a clay brightness of 83.4 points.

Example 24

The degritted crude kaolin clay of Example 23 was slurried to 30 percent solids with two pounds of sodium hexametaphosphate per ton of dry clay and then retained in a magnetic energy field of 18,000 gauss for four minutes. The slurry was then withdrawn from the field and a portion thereof was tested for brightness resulting in a clay brightness of 74.2 points. The remainder of the slurry was fractionated to a 90 percent finer than two micron diameter particles, E.S.D., fraction. The 90 percent fraction was bleached with 15 pounds of zinc hydrosulphite per ton of dry clay resulting in a clay brightness of 87.2 points, an increase of 3.8 points over that of the bleached control.

Example 25

Example 24 was repeated using three pounds of sodium hexametaphosphate per ton of dry clay to disperse slurry prior to magnetic separation and resulted in a clay brightness of 74.4 points after magnetic treatment and 87.2 points after fractionation and bleaching, an increase of 3.8 points over that of the bleached control.

Example 26

Example 24 was repeated using four pounds of sodium hexametaphosphate per ton of dry clay resulting in a clay brightness of 74.4 points after magnetic treatment and a clay brightness of 87.2 points after fractionation and bleaching, an increase of 3.8 points over that of the bleached control.

Example 27

The degritted crude kaolin clay of Example 23 was slurried to 20 percent solids without use of dispersant and then exposed to a magnetic energy field of 18,000 gauss for four minutes. The slurry was then withdrawn from the energy field and was determined to have a clay brightness of only 70.7. This slurry was fractionated to 90 percent particles finer than two microns, E.S.D., and bleached with 15 pounds of zinc hydrosulphite per ton of dry clay, resulting in a clay brightness of 83.6 points, an increase of merely 0.2 point over the brightness results obtained in Example 23, the same clay without magnetic treatment.

Example 28

Example 27 was repeated using four pounds of sodium hexametaphosphate per dry ton of clay to disperse slurry prior to magnetic separation and resulted in a clay brightness of 74.6 points after magnetic separation. After fractionation and bleaching, the fine fraction from this clay had a brightness of 87.3 points, an increase of 3.7 points over that of the bleached control.

The foregoing examples demonstrate that significant brightness improvements can be obtained in both refined and crude clays by exposing slurries of the clays to a wide range of high intensity magnetic energy fields for a varying retention time in the field. It should be pointed out that the clays of the above examples were passed through a 325 mesh screen after being slurried to eliminate any particles larger than 44 microns. In addition, the clays, except in Example 27, were all dispersed and slurried to from about fifteen percent to about 40 percent solids. In Examples 1 through 28 the clay slurry was at room temperature through the process.

The following examples illustrate the effects of practicing the invention under elevated temperature conditions. As can be clearly seen, the efficiency of the separation is thus improved.

Example 29

As a control for the following examples a sample of unbleached crude clay containing 60% particles finer than two microns diameter, E.S.D., was kneaded, slurried to 41.5 percent solids using 5 pounds hexametaphosphate per ton of dry clay. This clay had a brightness of 82.6 points and when bleached with eight pounds of zinc hydrosulphite and four pounds alum per ton of dry clay, had a brightness of 85.5 points.

Example 30

The dispersed clay slurry of Example 29, at a temperature of 30° C., was retained in a magnetic separator cavity under the influence of a high intensity magnetic force of 22,000 gauss for one minute. The 30° C. slurry was withdrawn from the field and had a clay brightness of 83.6 points and when bleached with eight pounds of zinc hydrosulphite and four pounds of alum per ton of dry clay, had a brightness of 86.3 points.

Example 31

Example 30 was repeated with a retention time in the magnetic field of 2 minutes. The unbleached brightness was 84.1 points and the bleached brightness was 87.0 points.

Example 32

Example 30 was repeated with a retention time in the magnetic field of 4 minutes. The unbleached brightness was 84.3 points and the bleached brightness was 87.0 points.

Example 33

Example 30 was repeated with the separator cavity preheated so that the 30° C. starting slurry was increased in temperature to 44° C. on discharge from the cavity. The unbleached clay brightness was 83.9 points and the bleached brightness was 86.7 points.

Example 34

Example 33 was repeated with the clay slurry retained 2 minutes in the preheated cavity and discharged at a temperature of 48° C. The unbleached brightness was 84.2 points and the bleached brightness was 87.0 points.

Example 35

Example 33 was repeated with the clay slurry retained 4 minutes in the preheated cavity and discharged at a temperature of 48° C. The unbleached brightness was 84.9 points and the bleached brightness was 87.4 points.

Example 36

Example 33 was repeated with the slurry preheated to 60° C. and the discharge temperature was 60° C. after one minute retention in the cavity. The unbleached brightness was 84.4 points and the bleached brightness was 86.8 points.

Example 37

Example 36 was repeated with the same preheat and discharge temperature of the slurry with a slurry retention time of 2 minutes in the cavity. The unbleached brightness was 85.0 points and the bleached brightness was 87.5 points.

Example 38

Example 36 was repeated with the same preheat and discharge temperatures of the slurry with a slurry retention time of 4 minutes in the cavity. The unbleached brightness was 85.2 points and the bleached brightness was 87.0 points.

The following examples illustrate the effects of practicing the invention under elevated temperature conditions and with a high solids content slurry. As can be clearly seen, the efficiency of the separation due to increased throughput is thus improved.

Example 39

As a control for the following examples a sample of unbleached crude clay containing 60% particles finer than two microns diameter, E.S.D., was kneaded, slurried to 60.0% solids using 5 pounds hexametaphosphate per ton of dry clay. This clay had a brightness of 81.5 points and when bleached with eight pounds of zinc hydrosulphite and four pounds alum per ton of dry clay, had a brightness of 85.8 points.

Example 40

The dispersed clay slurry of Example 39, at a temperature of 30° C., was retained in a magnetic separator cavity under the influence of a high intensity magnetic force of 22,000 gauss for one minute. The 30° C. slurry was withdrawn from the field and had a clay brightness of 82.5 points and when bleached with eight pounds of zinc hydrosulphite and four pounds of alum per ton of dry clay, had a brightness of 86.8 points.

Example 41

Example 40 was repeated with a retention time in the magnetic field of 2 minutes. The unbleached brightness was 82.8 points and the bleached brightness was 86.9 points.

Example 42

Example 40 was repeated with a retention time in the magnetic field of 4 minutes. The unbleached brightness was 82.9 points and the bleached brightness was 87.0 points.

Example 43

Example 40 was repeated with the separator cavity preheated so that the 30° C. starting slurry was increased in temperature to 46° C. on discharge from the cavity. The unbleached clay brightness was 82.6 points and the bleached brightness was 87.0 points.

Example 44

Example 43 was repeated with the clay slurry retained 2 minutes in the preheated cavity and discharged at a temperature of 48° C. The unbleached brightness was 83.0 points and the bleached brightness was 87.0 points.

Example 45

Example 43 are repeated with the clay slurry retained 4 minutes in the preheated cavity and discharged at a temperature of 50° C. The unbleached brightness was 83.4 points and the bleached brightness was 87.5 points.

Example 46

Example 43 was repeated with the slurry preheated to 60° C. and the discharge temperature was 55° C. after one minute retention in the cavity. The unbleached brightness was 82.6 points and the bleached brightness was 86.8 points.

Example 47

Example 46 was repeated with the same preheat and discharge temperature of the slurry with a slurry retention time of 2 minutes in the cavity. The unbleached brightness was 83.0 points and the bleached brightness was 87.2 points.

Example 48

Example 46 was repeated with the same preheat and discharge temperatures of the slurry with a slurry retention time of 4 minutes in the cavity. The unbleached brightness was 83.4 points and the bleached brightness was 87.3 points.

We claim:
1. A method of improving the brightness of kaolin clays by magnetically separating therefrom discoloring particles having a low magnetic susceptibility wherein the improvement comprises subjecting a dispersed kaolin clay-water slurry having an elevated temperature to a high intensity magnetic field of at least 8,500 gauss for from at least 30 seconds and up to eight minutes.

2. A method of improving the brightness of kaolin clays by magnetically separating therefrom discoloring particles having a low magnetic susceptibility wherein the improvement comprises increasing the brightness of kaolin clays at least one brightness point by subjecting a dispersed kaolin clay-water slurry to a high intensity magnetic field of at least 8,500 gauss while retaining said kaolin clay-water slurry within said high intensity magnetic field for from at least 30 seconds up to 8 minutes to separate from the slurry particles of low magnetic susceptibility.

References Cited

UNITED STATES PATENTS

| | | | |
|---|---|---|---|
| 90,565 | 5/1869 | Lynd | 209—215 X |
| 403,250 | 5/1889 | Cheever | 209—214 |
| 2,074,085 | 3/1937 | Frantz | 209—215 |
| 2,072,907 | 3/1937 | Rowand | 209—214 |
| 2,088,364 | 7/1937 | Ellis | 209—232 X |
| 2,230,344 | 2/1941 | Bair | 209—214 |
| 3,224,582 | 12/1965 | Iannicelli | 209—866 |
| 3,289,836 | 12/1966 | Weston | 209—232 X |

HARRY B. THORNTON, Primary Examiner

R. HALPER, Assistant Examiner